3,164,308
CONTAINERS FOR LIQUIFIED FUEL GAS
Isaac Marcovitch and Jacob Marcovitch, both of 31 Bitcon Road, Village Deep, Johannesburg, Transvaal, Republic of South Africa
Filed Feb. 26, 1962, Ser. No. 175,572
Claims priority, application Republic of South Africa, Feb. 28, 1961, 61/811
4 Claims. (Cl. 222—549)

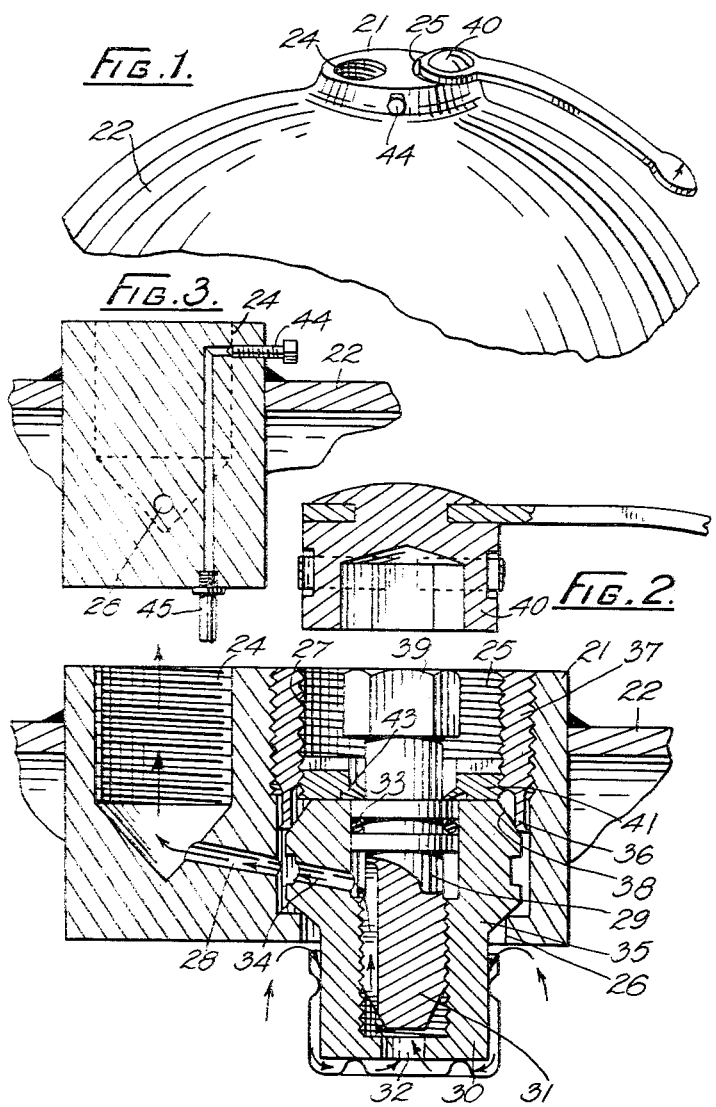

This invention relates to containers for liquified gases such as liquified petroleum gas.

An object of the invention is to provide a container which does not rely on externally attached valves for controlling flow into and from the container.

The invention is further discussed with reference to the accompanying drawings, in which FIGURE 1 is a perspective view of the top of a container according to the invention, FIGURE 2 is an enlarged longitudinal section through the boss of the container of FIGURE 1, and FIGURE 3 is a cross section through the boss of the container of FIGURE 1.

In the illustrated embodiment a boss 21, provided with two adjacent sockets, is mounted in an aperture at the top center of a tank 22 which has the usual rounded top. The boss 21 is let into the tank so that only a small thickness projects about the wall of the tank.

The boss 21 has two sockets 24 and 25 (see FIGURE 2). The outlet socket 24 is blind and screw threaded to make a connection with a pipe spigot or the spigot of a gas appliance such as a cooker head. The socket 24 in use is on the central axis of the tank. The closely adjacent second socket 25 is bored right through and also counterbored to provide a shoulder 26. The top portion 27 of the socket 25 is threaded for purposes to be described later on.

In the party wall between the sockets 24 and 25 there is a short communicating passage 28.

The socket 25 houses a removable valve unit 29 which has a casing 30, a valve member or spindle 31 adapted to seat on a port 32 in the end of the casing and an O-seal 33. The casing is apertured at 34 for gas to flow from the port 32 through a flow passage via an axial slot in the periphery of the spindle 31 to an annular space around the casing that is in communication with the passage 28.

The casing 30 is sealed in position in the following manner. It is formed with a conical section 35 adapted to seat on the shoulder 26. A ring or sealing nut 37, threaded internally and externally, screws into the top of the socket 25 and is formed with an annular tongue 36 adapted to seal between another conical portion 38 and the unthreaded wall of the socket 25. The nut 37 is screwed home by means of a threaded tool engaging on its internal threading. On being screwed home it forces the casing against the shoulder 26 and also forces the tongue into sealing position with both the wall, the socket 25 and the conical part 38. The casing is thus held in position with metal to metal seals only that can withstand fairly high pressures.

The spindle 31 is formed with a hexagonal head 39 adapted to co-operate with a key 40. To prevent withdrawal of the spindle 31 it is surrounded by a locking nut 41 adapted to pass over the head 39 and peened after such passage to provide locking lips 43.

A further feature requires notice. The lower end of the casing 30 is covered by means of a cap of thin metal that is suitably indented to provide stiffness and a firm grip on such end. Gas is thus forced to travel along the path indicated by the arrows and no harm results if liquid actually reaches to the lower end of the casing 30.

As an optional feature, a filler valve 44 of known construction (shown in detail in FIGURE 3) is provided. The significant feature in the present case is that the filler valve 44 is provided in the boss 21. The valve 44 is only opened during filling operations and serves to indicate when the level of liquid reaches the end of the tube 45 projecting downwardly from the valve. In suitable cases, the valve 44 may not be required as is well known in the art. Alternatively the valve 44 could be a relief valve of the kind sometimes used on these containers.

We claim:

1. A tank having an outlet socket for fluid, a second socket having a dispensing passage communicating with the outlet socket, said second socket communicating with the interior of the tank, a valve in said second socket for controlling flow of fluid from the interior of the tank to said outlet socket, the valve including a valve casing having a flow passage therethrough and a valve member movable in the casing between open and closed positions, the valve casing having a seat surrounding the flow passage and against which the valve member bears in closed position to close the flow passage, a ring in the second socket securing the valve casing in the second socket, and an element detachably secured to the ring for maintaining the valve member in the valve casing.

2. A tank as claimed in claim 1, said element comprising a second ring in screw-threaded engagement with the interior of the first-mentioned ring.

3. A tank having an outlet socket for fluid, a second socket having a dispensing passage communicating with the outlet socket, said second socket communicating with the interior of the tank, a valve in said second socket for controlling flow of fluid from the interior of the tank to said outlet socket, the valve including a valve casing having a flow passage therethrough and a valve member movable in the casing between open and closed positions, the valve casing having a seat surrounding the flow passage and against which the valve member bears in closed position to close the flow passage, and a ring in screw-threaded engagement with said second socket, the casing having a tapered peripheral surface thereon, the ring contacting the tapered surface and being urged radially outwardly by the tapered surface into sealing contact with said second socket.

4. A container as claimed in claim 3, the second socket having a shoulder thereon, the casing having a second conical surface which rests on said shoulder.

References Cited by the Examiner
UNITED STATES PATENTS

| | | | |
|---|---|---|---|
| 531,053 | 12/94 | Mueller | 222—3 |
| 1,630,785 | 5/27 | Collins | 222—3 |
| 2,078,567 | 4/37 | Foregger | 222—3 |
| 2,527,359 | 10/50 | Guth | 222—3 |
| 3,072,289 | 1/63 | Stopp | 222—3 |

LOUIS J. DEMBO, *Primary Examiner.*

RAPHAEL M. LUPO, *Examiner.*